United States Patent [19]
DeFreitas

[11] Patent Number: 5,826,935
[45] Date of Patent: Oct. 27, 1998

[54] AUTOMATIC BICYCLE SEAT ADJUSTER

[76] Inventor: Renato J. DeFreitas, 40 Waters Road, Kingston Upon Thames, Surrey, United Kingdom, KT1 3LP

[21] Appl. No.: 974,049

[22] Filed: Nov. 19, 1997

[51] Int. Cl.[6] ........................................... B62D 1/00
[52] U.S. Cl. ................................ 297/215.13; 297/344.19; 248/404; 248/631
[58] Field of Search ......................... 297/215.13, 344.19; 248/404, 161, 631; 280/288.4

[56] References Cited

U.S. PATENT DOCUMENTS

| | | | |
|---|---|---|---|
| 3,861,740 | 1/1975 | Tajima et al. | 297/215.13 |
| 4,150,851 | 4/1979 | Cienfuegos | 297/215.13 |
| 5,636,899 | 6/1997 | Schiff et al. | 297/344.19 |
| 5,713,555 | 2/1998 | Zurfluh et al. | 248/631 |

Primary Examiner—Peter M. Cuomo
Assistant Examiner—Anthony D. Barfield

[57] ABSTRACT

A new automatic bicycle seat adjuster for adjusting a bicycle seat's height while riding. The inventive device includes a support tube slidably receivable within an existing seat support tube of a bicycle frame. The support tube has a generally elongated and cylindrical configuration with an open upper end and a closed lower end. A gas cylinder is received within the support tube. The gas cylinder has a lower end secured to the closed lower end of the support tube. The gas cylinder has a release valve extending upwardly from an upper end thereof with the release valve positioned outwardly of the open upper end of the support tube. A bicycle seat is adjustably secured with respect to the gas cylinder. A release lever is coupled with respect to the release valve of the gas cylinder.

5 Claims, 2 Drawing Sheets

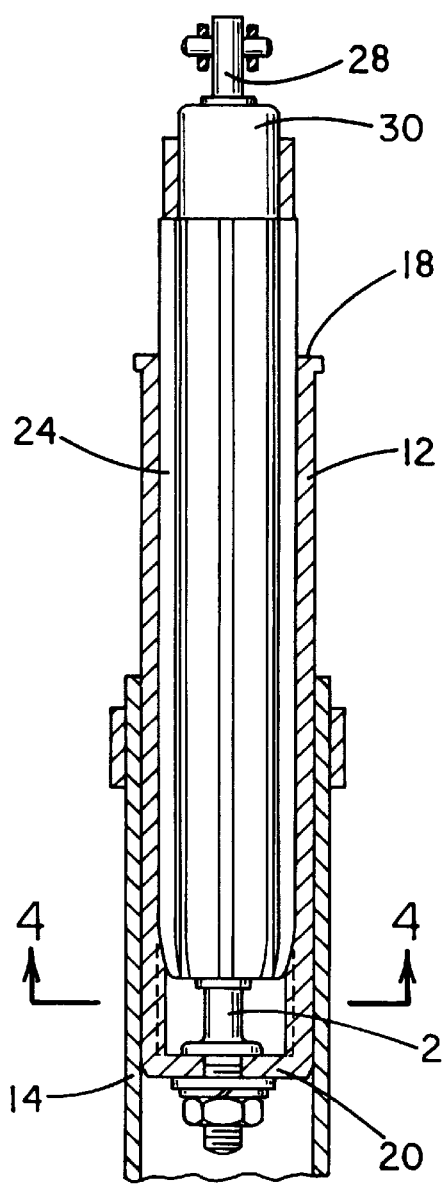
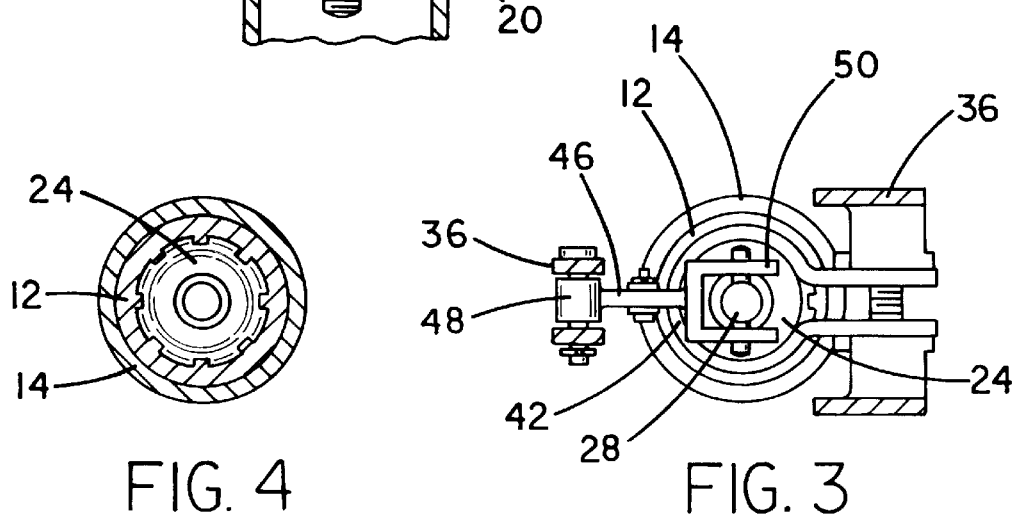

AUTOMATIC BICYCLE SEAT ADJUSTER

BACKGROUND OF THE INVENTION

1. Field of the Invention

The present invention relates to bicycle seats and more particularly pertains to a new automatic bicycle seat adjuster for adjusting a bicycle seat's height while riding.

2. Description of the Prior Art

The use of bicycle seats is known in the prior art. More specifically, bicycle seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle seats include U.S. Pat. No. 3,861,740 to Tajima et al.; U.S. Pat. No. 5,236,169 to Johnsen; U.S. Pat. No. 4,789,176 to Carroll; U.S. Pat. No. 5,007,675 to Musto et al.; U.S. Pat. No. 5,441,327 to Sanderson; and U.S. Pat. No. 4,226,435 to Efros.

While these devices fulfill their respective, particular objectives and requirements, the aforementioned patents do not disclose a new automatic bicycle seat adjuster. The inventive device includes a support tube slidably receivable within an existing seat support tube of a bicycle frame. The support tube has a generally elongated and cylindrical configuration with an open upper end and a closed lower end. A gas cylinder is received within the support tube. The gas cylinder has a lower end secured to the closed lower end of the support tube. The gas cylinder has a release valve extending upwardly from an upper end thereof with the release valve positioned outwardly of the open upper end of the support tube. A bicycle seat is adjustably secured with respect to the gas cylinder. A release lever is coupled with respect to the release valve of the gas cylinder.

In these respects, the automatic bicycle seat adjuster according to the present invention substantially departs from the conventional concepts and designs of the prior art, and in so doing provides an apparatus primarily developed for the purpose of adjusting a bicycle seat's height while riding.

SUMMARY OF THE INVENTION

In view of the foregoing disadvantages inherent in the known types of bicycle seats now present in the prior art, the present invention provides a new automatic bicycle seat adjuster construction wherein the same can be utilized for adjusting a bicycle seat's height while riding.

The general purpose of the present invention, which will be described subsequently in greater detail, is to provide a new automatic bicycle seat adjuster apparatus and method which has many of the advantages of the bicycle seats mentioned heretofore and many novel features that result in a new automatic bicycle seat adjuster which is not anticipated, rendered obvious, suggested, or even implied by any of the prior art bicycle seats, either alone or in any combination thereof.

To attain this, the present invention generally comprises a support tube that is slidably receivable within an existing seat support tube of a bicycle frame. The support tube has a generally elongated and cylindrical configuration with an open upper end and a closed lower end. A support clamp is engageable around the seat support tube of the bicycle frame for fixedly securing the support tube with respect to the seat support tube. A gas cylinder is received within the support tube. The gas cylinder has a lower end secured to the closed lower end of the support tube. The gas cylinder has a release valve extending upwardly from an upper end thereof with the release valve positioned outwardly of the open upper end of the support tube. A bicycle seat is adjustably secured with respect to the gas cylinder. The bicycle seat includes a seat portion having a mounting bracket disposed on a lower portion thereof. A spring is positioned between the mounting bracket and the seat portion. The mounting bracket has a lower segment extending downwardly therefrom. The lower segment has a pivotable clamp disposed on a free end thereof. The pivotable clamp is secured to the gas cylinder downwardly of the upper end thereof. A release lever is coupled with respect to the release valve of the gas cylinder. The release lever has an arm with an outer end secured to the mounting bracket and an inner bifurcated end secured to the release valve. The release lever includes a cable extending outwardly from an intermediate portion of the arm. The cable is adapted for coupling with an existing release handle disposed on a handle of the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new automatic bicycle seat adjuster apparatus and method which has many of the advantages of the bicycle seats mentioned heretofore and many novel features that result in a new automatic bicycle seat adjuster which is not anticipated, rendered obvious, suggested, or even implied by any of the prior art bicycle seats, either alone or in any combination thereof.

It is another object of the present invention to provide a new automatic bicycle seat adjuster which may be easily and efficiently manufactured and marketed.

It is a further object of the present invention to provide a new automatic bicycle seat adjuster which is of a durable and reliable construction.

An even further object of the present invention is to provide a new automatic bicycle seat adjuster which is susceptible of a low cost of manufacture with regard to both materials and labor, and which accordingly is then susceptible of low prices of sale to the consuming public, thereby making such automatic bicycle seat adjuster economically available to the buying public.

Still yet another object of the present invention is to provide a new automatic bicycle seat adjuster which provides in the apparatuses and methods of the prior art some of the advantages thereof, while simultaneously overcoming some of the disadvantages normally associated therewith.

Still another object of the present invention is to provide a new automatic bicycle seat adjuster for adjusting a bicycle seat's height while riding.

Yet another object of the present invention is to provide a new automatic bicycle seat adjuster which includes a support tube slidably receivable within an existing seat support tube of a bicycle frame. The support tube has a generally elongated and cylindrical configuration with an open upper end and a closed lower end. A gas cylinder is received within the support tube. The gas cylinder has a lower end secured to the closed lower end of the support tube. The gas cylinder has a release valve extending upwardly from an upper end thereof with the release valve positioned outwardly of the open upper end of the support tube. A bicycle seat is adjustably secured with respect to the gas cylinder. A release lever is coupled with respect to the release valve of the gas cylinder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross-sectional view of the present invention as taken along line 2—2 of FIG. 1.

FIG. 3 is a cross-sectional view of the present invention as taken along line 3—3 of FIG. 1.

FIG. 4 is a cross-sectional view of the present invention as taken along line 4—4 of FIG. 2.

DESCRIPTION OF THE PREFERRED EMBODIMENT

Figure 1:
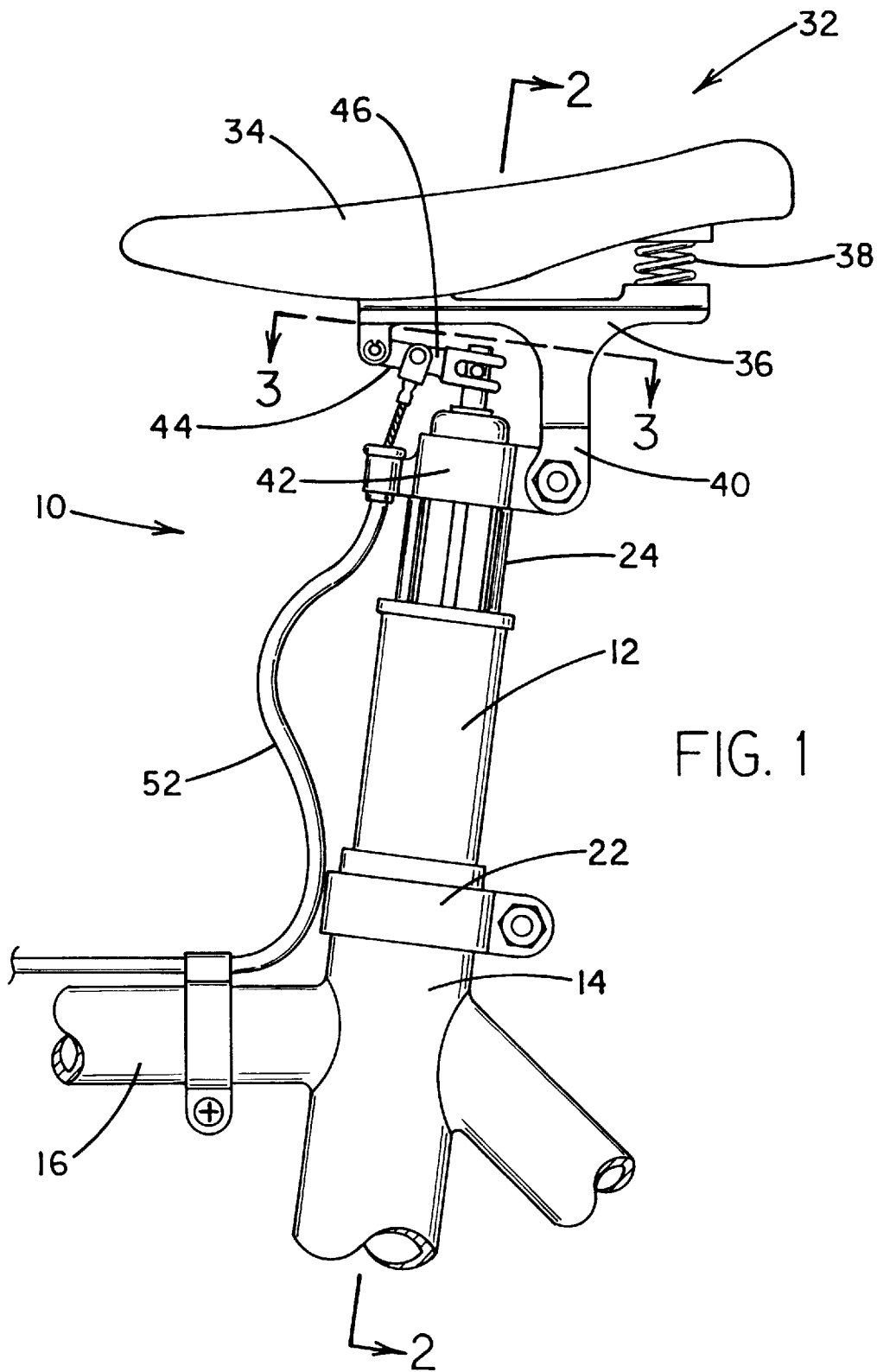
FIG. 1 is a side view of a new automatic bicycle seat adjuster according to the present invention.

With reference now to the drawings, and in particular to FIGS. 1 through 4 thereof, a new automatic bicycle seat adjuster embodying the principles and concepts of the present invention and generally designated by the reference numeral 10 will be described.

As best illustrated in FIGS. 1 through 4, the automatic bicycle seat adjuster 10 comprises a support tube 12 that is slidably receivable within an existing seat support tube 14 of a bicycle frame 16. The support tube 12 has a generally elongated and cylindrical configuration with an open upper end 18 and a closed lower end 20. A support clamp 22 is engageable around the seat support tube 14 of the bicycle frame 16 for fixedly securing the support tube 12 with respect to the seat support tube 14.

A gas cylinder 24 is received within the support tube 12. The gas cylinder 24 has a lower end 26 secured to the closed lower end 20 of the support tube 12. The gas cylinder 24 has a release valve 28 extending upwardly from an upper end 30 thereof with the release valve 28 positioned outwardly of the open upper end 18 of the support tube 12.

A bicycle seat 32 is adjustably secured with respect to the gas cylinder 24. The bicycle seat 32 includes a seat portion 34 having a mounting bracket 36 disposed on a lower portion thereof. A spring 38 is positioned between the mounting bracket 36 and the seat portion 34. The mounting bracket 36 has a lower segment 40 extending downwardly therefrom. The lower segment 40 has a pivotable clamp 42 disposed on a free end thereof. The pivotable clamp 42 is secured to the gas cylinder 24 downwardly of the upper end 30 thereof.

A release lever 44 is coupled with respect to the release valve 28 of the gas cylinder 24. The release lever 44 has an arm 46 with an outer end 48 secured to the mounting bracket 36 and an inner bifurcated end 50 secured to the release valve 28. The release lever 44 includes a cable 52 extending outwardly from an intermediate portion of the arm 46. The cable 52 is adapted for coupling with an existing release handle disposed on a handle of the bicycle (Not illustrated).

In use, the device 10 would be incorporated into the bicycle frame 16. While riding the bicycle, the bicyclist could adjust the seat portion 34 by forcing pressure on the release valve 28. The seat can be lowered by pressuring the release valve 28 while sitting on the seat and conversely, the seat can be raised by lifting off of the seat while pressuring the release valve 28.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new automatic bicycle seat adjuster for adjusting a bicycle seat's height while riding comprising, in combination:

a support tube slidably receivable within an existing seat support tube of a bicycle frame, the support tube having a generally elongated and cylindrical configuration with an open upper end and a closed lower end, a support clamp engageable around the seat support tube of the bicycle frame for fixedly securing the support tube with respect to the seat support tube;

a gas cylinder received within the support tube, the gas cylinder having a lower end secured to the closed lower end of the support tube, the gas cylinder having a release valve extending upwardly from an upper end thereof with the release valve positioned outwardly of the open upper end of the support tube;

a bicycle seat adjustably secured with respect to the gas cylinder, the bicycle seat including a seat portion having a mounting bracket disposed on a lower portion thereof, a spring positioned between the mounting bracket and the seat portion, the mounting bracket having a lower segment extending downwardly therefrom, the lower segment having a pivotable clamp disposed on a free end thereof, the pivotable clamp secured to the gas cylinder downwardly of the upper end thereof; and a release lever coupled with respect to the release valve of the gas cylinder, the release lever having an arm with an outer end secured to the mounting bracket and an inner bifurcated end secured to the release valve, the release lever including a cable extending outwardly from an intermediate portion of the arm, the cable adapted for coupling with an existing release handle disposed on a handle of the bicycle.

2. A new automatic bicycle seat adjuster for adjusting a bicycle seat's height while riding comprising, in combination:

a support tube slidably receivable within an existing seat support tube of a bicycle frame, the support tube having a generally elongated and cylindrical configuration with an open upper end and a closed lower end;

a gas cylinder received within the support tube, the gas cylinder having a lower end secured to the closed lower end of the support tube, the gas cylinder having a release valve extending upwardly from an upper end thereof with the release valve positioned outwardly of the open upper end of the support tube;

a bicycle seat adjustably secured with respect to the gas cylinder; and a release lever coupled with respect to the release valve of the gas cylinder.

3. The automatic bicycle seat adjuster as set forth in claim 2 and further including a support clamp engageable around the seat support tube of the bicycle frame for fixedly securing the support tube with respect to the seat support tube.

4. The automatic bicycle seat adjuster as set forth in claim 2 wherein the bicycle seat includes a seat portion having a mounting bracket disposed on a lower portion thereof, a spring positioned between the mounting bracket and the seat portion, the mounting bracket having a lower segment extending downwardly therefrom, the lower segment having a pivotable clamp disposed on a free end thereof, the pivotable clamp secured to the gas cylinder downwardly of the upper end thereof.

5. The automatic bicycle seat adjuster as set forth in claim 2 wherein the release lever has an arm with an outer end secured with respect to the bicycle seat and an inner bifurcated end secured to the release valve, the release lever including a cable extending outwardly from an intermediate portion of the arm, the cable adapted for coupling with an existing release handle disposed on a handle of the bicycle.

* * * * *